(12) United States Patent
Ghim et al.

(10) Patent No.: US 12,326,402 B2
(45) Date of Patent: Jun. 10, 2025

(54) VIBRATION INSENSITIVE INTERFEROMETRY FOR MEASURING THICKNESS AND PROFILE OF MULTILAYER THIN-FILM

(71) Applicant: Korean Research Institute of Standard and Science, Daejeon (KR)

(72) Inventors: Yong-sik Ghim, Sejong-Si (KR); Yong-bum Seo, Gwangju (KR); Hyug-gyo Rhee, Daejeon (KR)

(73) Assignee: Korean Research Institute of Standard and Science, Daejeon (KR)

( * ) Notice: Subject to any disclaimer, the term of this patent is extended or adjusted under 35 U.S.C. 154(b) by 181 days.

(21) Appl. No.: 17/790,420

(22) PCT Filed: Mar. 16, 2020

(86) PCT No.: PCT/KR2020/003593
§ 371 (c)(1),
(2) Date: Jun. 30, 2022

(87) PCT Pub. No.: WO2021/172647
PCT Pub. Date: Sep. 2, 2021

(65) Prior Publication Data
US 2023/0042414 A1 Feb. 9, 2023

(30) Foreign Application Priority Data
Feb. 25, 2020 (KR) .................. 10-2020-0023107

(51) Int. Cl.
*G01N 21/45* (2006.01)
*G01B 9/02* (2022.01)
(Continued)

(52) U.S. Cl.
CPC ......... *G01N 21/45* (2013.01); *G01B 9/02044* (2013.01); *G01B 11/06* (2013.01);
(Continued)

(58) Field of Classification Search
CPC . G01B 11/06; G01B 11/0675; G01B 11/2441; G01B 9/02044; G01N 21/21;
(Continued)

(56) References Cited

U.S. PATENT DOCUMENTS 6,850,329 B2   2/2005  Tobiason et al.
2011/0237999 A1  9/2011  Muller et al.
(Continued)

FOREIGN PATENT DOCUMENTS

JP   2013-024734    2/2013
KR   10-2013-0035464   4/2013
(Continued)

OTHER PUBLICATIONS

International Search Report, PCT/KR2020/003593, Nov. 25, 2020.

*Primary Examiner* — Hina F Ayub
(74) *Attorney, Agent, or Firm* — Akerman LLP

(57) ABSTRACT

The present disclosure relates to an apparatus and a method for a thickness and a profile of a multilayer thin film using a vibration insensitive interference method are provided, which allow measuring the phase of a measurement object by acquiring a plurality of different phase-shifted interference signal images at a time through interference signals between a reference flat and the measurement object by a polarizing beam splitter, a quarter-wave plate, a shutter and a pixelated polarizing camera, and which also allow measuring reflectance of the measurement object by acquiring a plurality of reflected signal images obtained at a time through respective reflected lights for each of a reference surface and the measurement object by a plurality of different polarizers.

3 Claims, 7 Drawing Sheets

(51) Int. Cl.
   *G01B 11/06* (2006.01)
   *G01B 11/24* (2006.01)
   *G01N 21/21* (2006.01)
   *G02B 27/28* (2006.01)

(52) U.S. Cl.
   CPC ......... *G01B 11/2441* (2013.01); *G01N 21/21* (2013.01); *G02B 27/283* (2013.01)

(58) Field of Classification Search
   CPC .... G01N 21/45; G02B 27/283; G02B 27/285; G02B 5/3083
   See application file for complete search history.

(56) References Cited

U.S. PATENT DOCUMENTS

2019/0101373 A1* 4/2019 Ghim ................. G01B 11/0625
2021/0088453 A1* 3/2021 Smith ................. G01B 9/0203
2022/0397392 A1* 12/2022 Courteville .......... G03H 1/0005

FOREIGN PATENT DOCUMENTS

KR 10-1358091 2/2014
WO WO-2017217590 A1 * 12/2017 ......... G01B 11/0625

* cited by examiner

[FIG. 1]
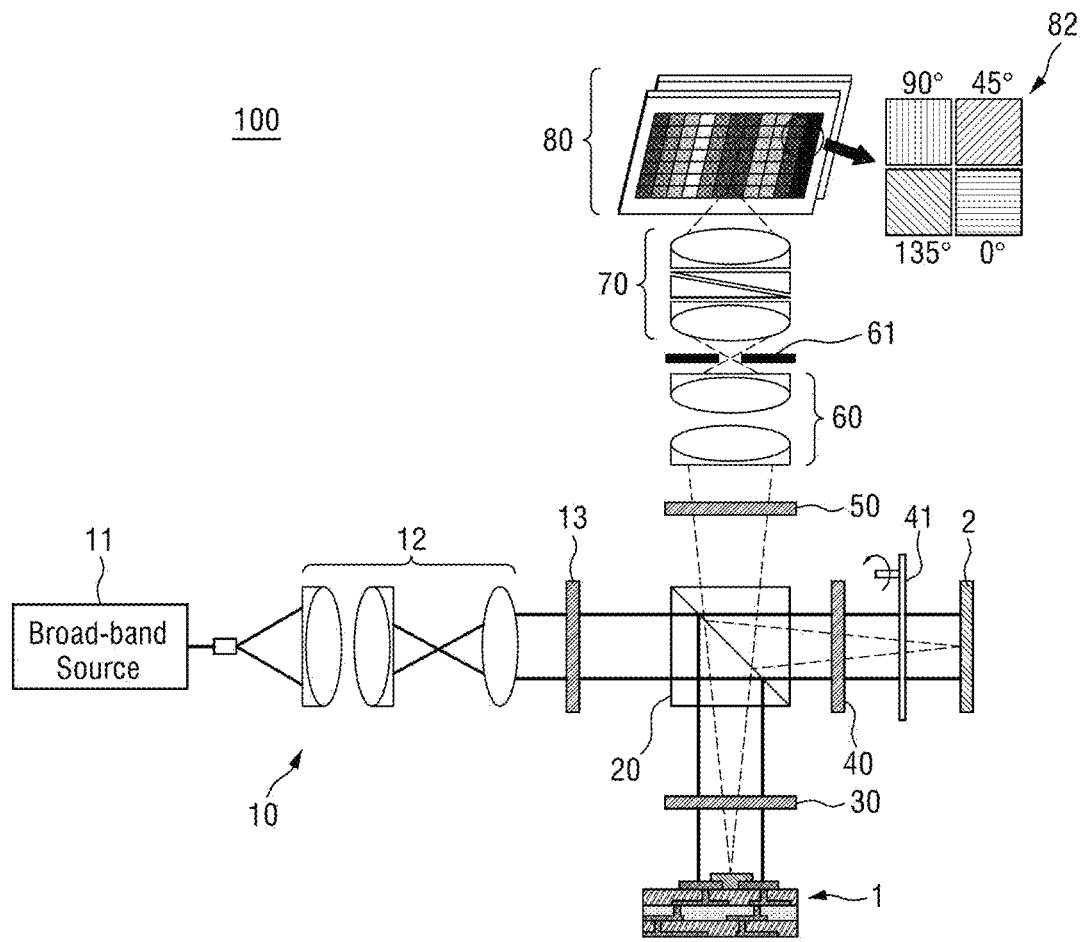
[FIG. 2]
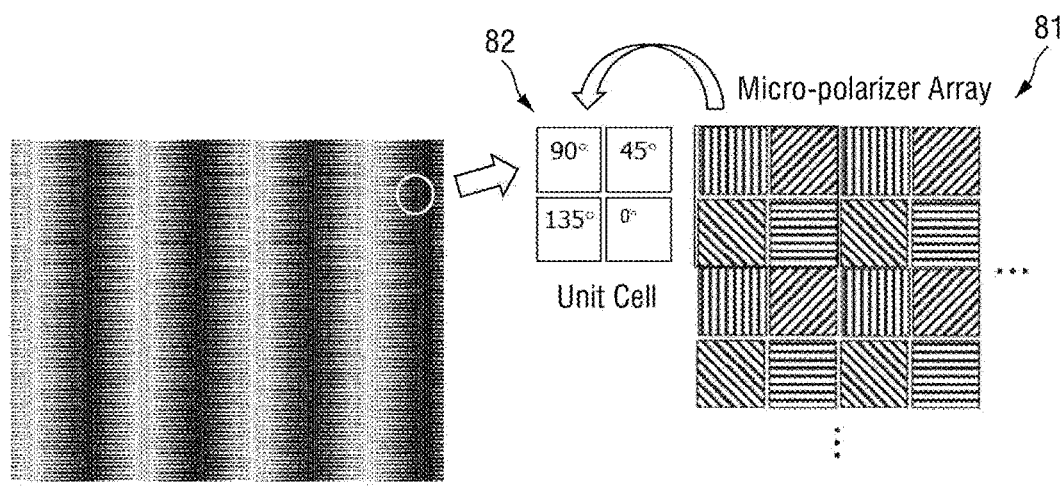

[FIG. 3]
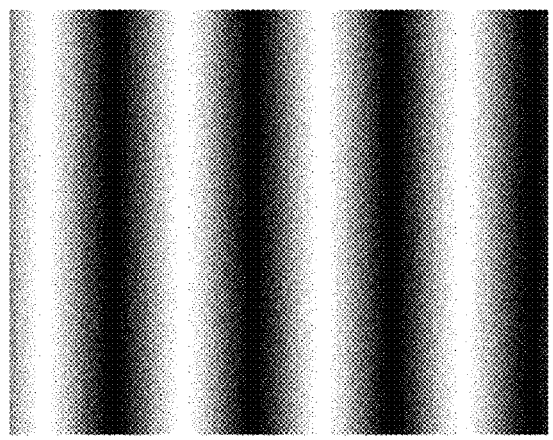
[FIG. 4]
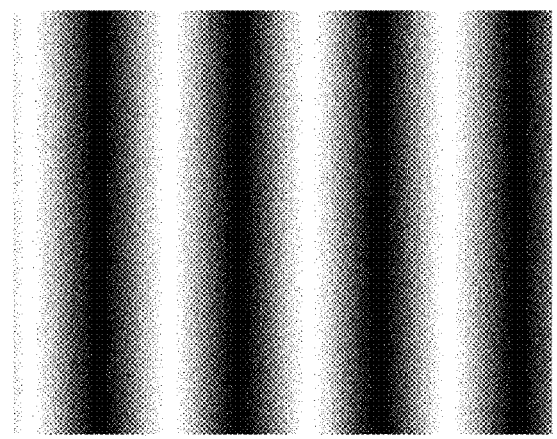
[FIG. 5]
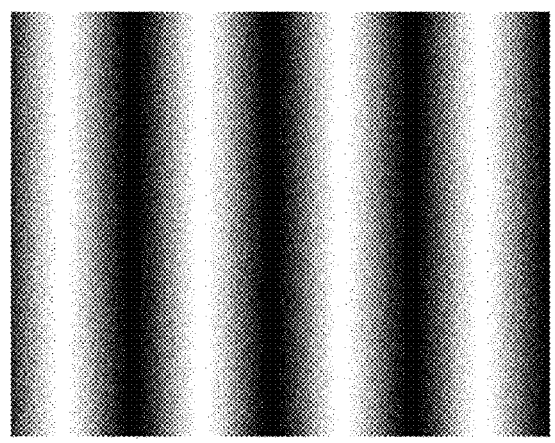

[FIG. 6]
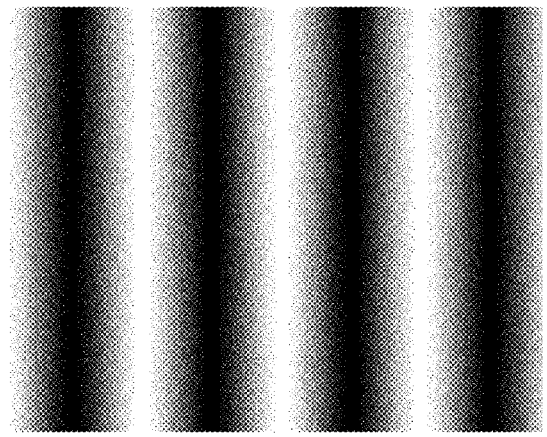
[FIG. 7]
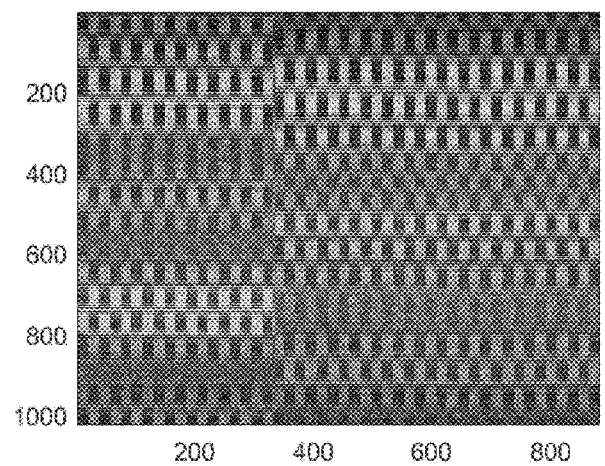
[FIG. 8]
90°
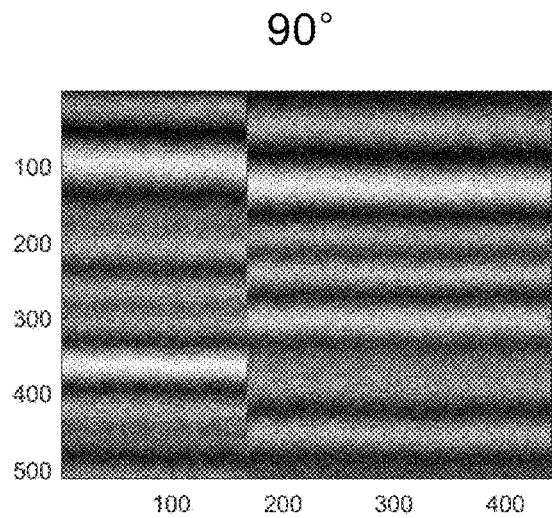

[FIG. 9]
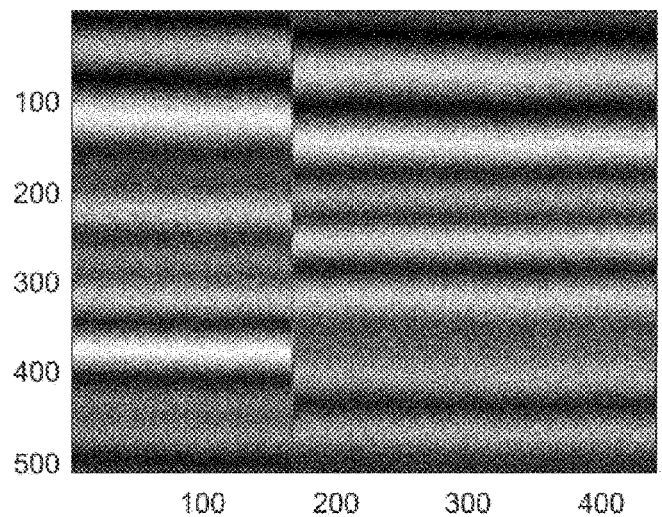
[FIG. 10]
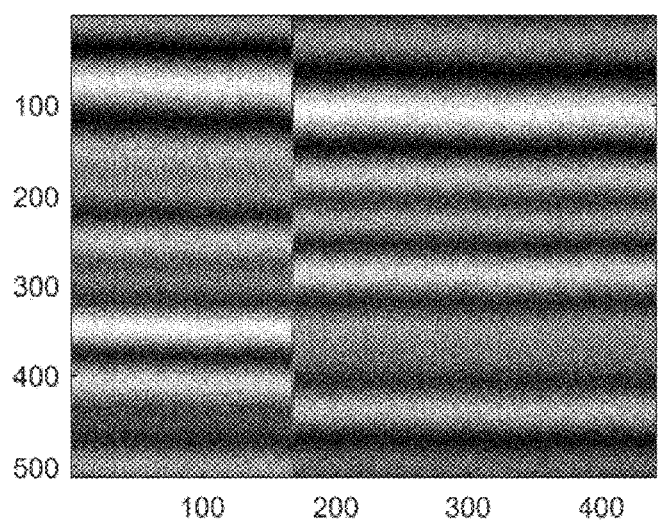

[FIG. 11]
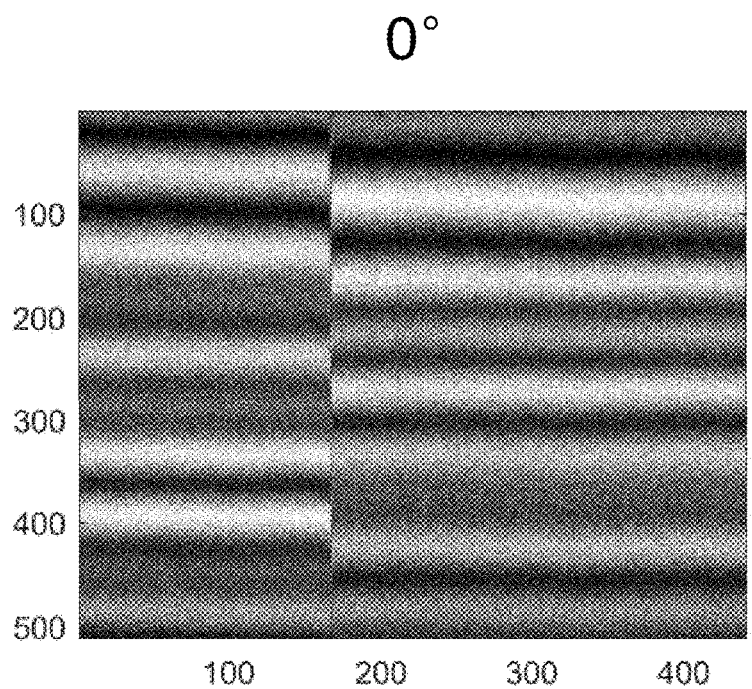
[FIG. 12]
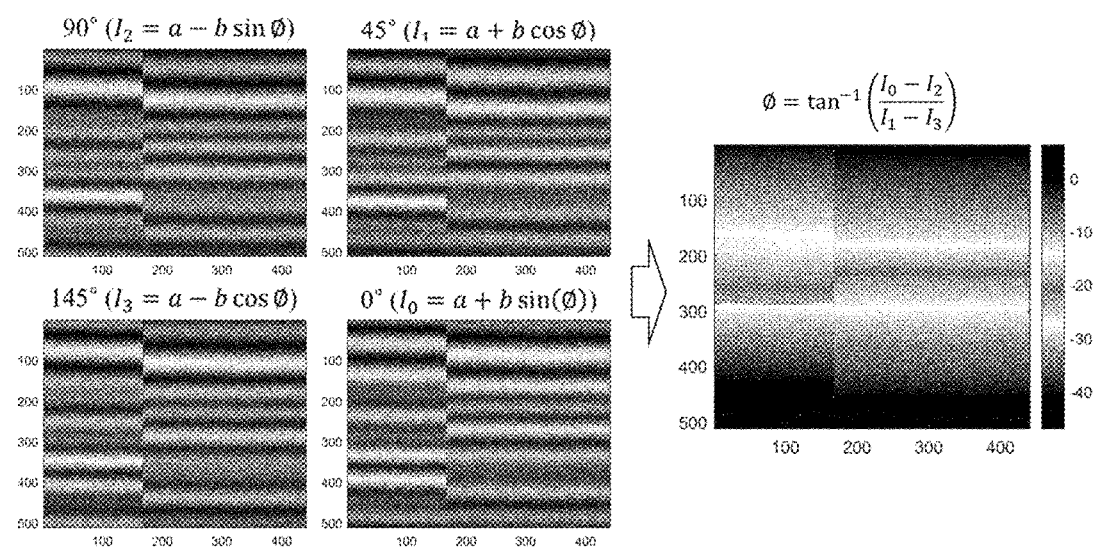

[FIG. 13]
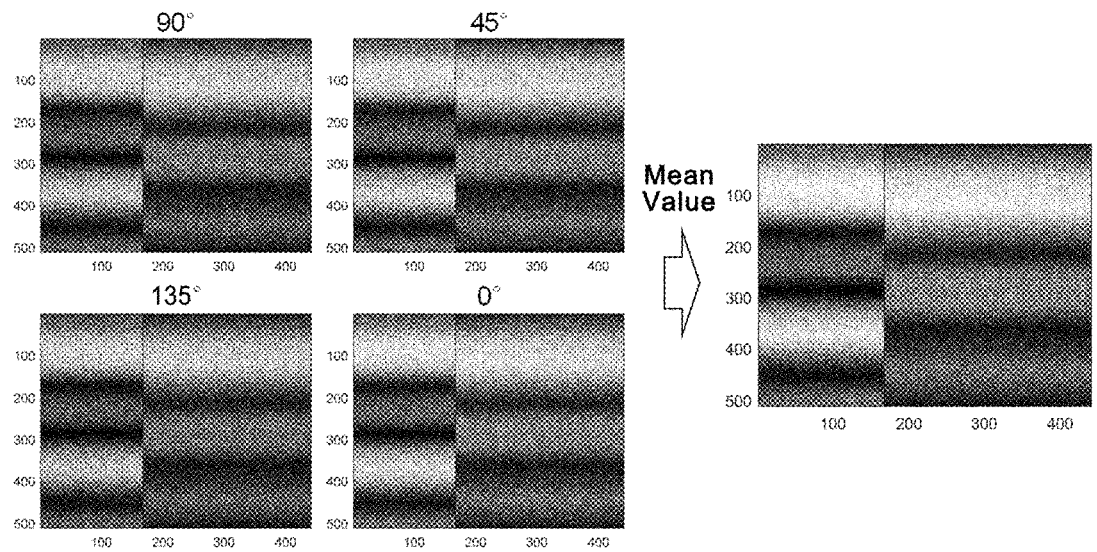
[FIG. 14]
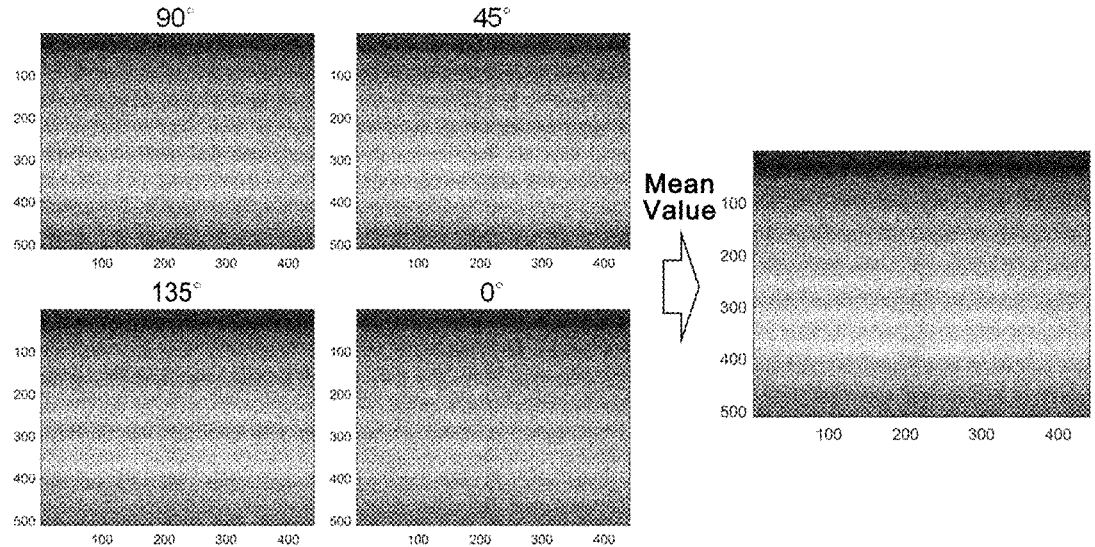

[FIG. 15]
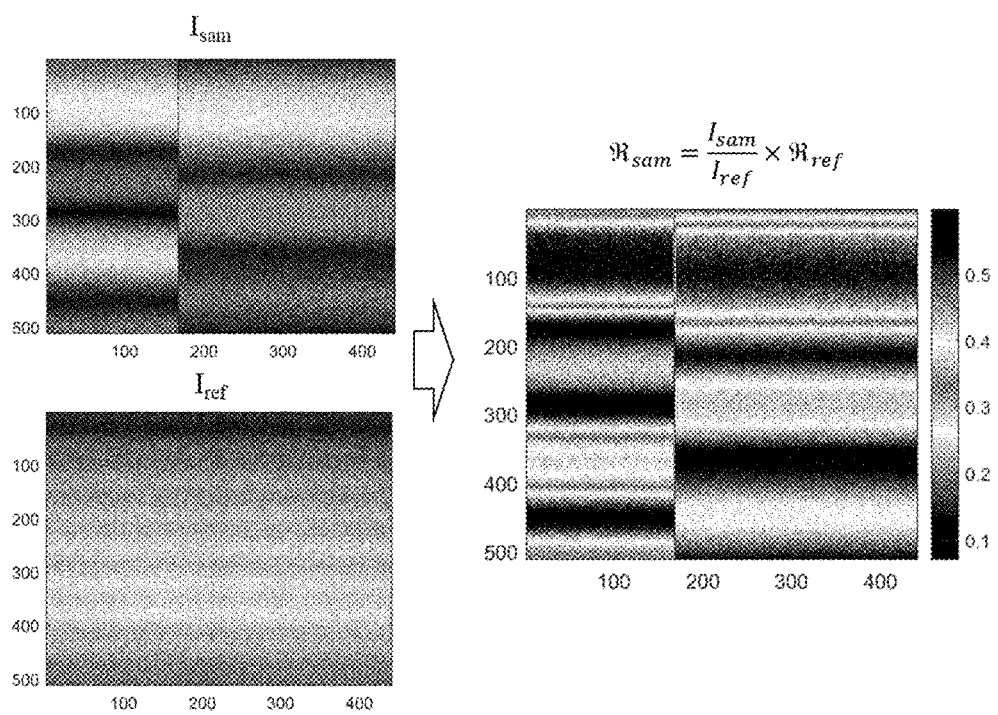

VIBRATION INSENSITIVE INTERFEROMETRY FOR MEASURING THICKNESS AND PROFILE OF MULTILAYER THIN-FILM

CROSS-REFERENCE TO RELATED APPLICATIONS

This application is a national phase of PCT/KR2020/003593, filed Mar. 16, 2020, and claims priority to Korean Patent Application No. 10-2020-0023107, filed Feb. 25, 2020, the entire contents of both of which are hereby incorporated herein by reference.

BACKGROUND

Technical Field

The present disclosure relates to an apparatus and a method for measuring a thickness and a profile of a multilayer thin film, which are insensitive to external vibrations and environmental changes.

Related Art

An ellipsometer is widely used for analyzing the structure of a multilayer (thin) film in the semiconductor industry, which is capable of measuring very important film parameters, such as thickness and refractive indexes that are usable for quality inspection of the film. However, due to a large spot size of 25 μm or more, changes in the polarization state of reflected lights should be measured by continuously changing a low spatial resolution, an incident angle and a wavelength, this resulting in a disadvantage that the measurement time is long. Accordingly, it is difficult to use this ellipsometer as a production test equipment in industrial settings. In addition, a single point measurement manner is limited to thickness measurement only, not allowing profile measurement of each layer.

In order to overcome all technical limits described above, it is demanded to develop a new concept of measurement method overcoming the disadvantage of existing thickness measurement methods of a multilayer film. According to an embodiment of the present disclosure, a vibration insensitive interferometry was developed, which is insensitive to external vibrations and environmental changes and is capable of simultaneously measuring a thickness and a profile for each layer of a multilayer film structure.

SUMMARY

Technical Problem

Therefore, the present disclosure is contrived to solve conventional problems as described above. According to an embodiment of the present disclosure, an apparatus and a method for measuring a thickness and a profile of a multilayer thin film using a vibration insensitive interference method are provided, which allow measuring a phase of a measurement object by acquiring a plurality of different phase-shifted interference signal images at a time through interference signals between a reference flat and the measurement object by a polarizing beam splitter, a quarter-wave plate, a shutter and a pixelated polarizing camera, and which also allow measuring reflectance of the measurement object by acquiring a plurality of reflected signal images obtained at a time through respective reflected lights for each of a reference surface and the measurement object by a plurality of different polarizers.

Technical Solution

According to a first aspect of the present disclosure, in an apparatus for profile measurement of a measurement object coated with a multilayer thin film, an apparatus for measuring a thickness and a profile of a multilayer thin film using a vibration insensitive interferometer may include: an illumination optical module that has a light source for emitting light; a polarizing beam splitter that reflects a first polarized wave of light emitted from the illumination optical module, and transmits a second polarized wave; a first quarter-wave plate that converts a reflected light reflected on a measurement object into a second polarized reflected wave after the first polarized wave reflected by the polarized beam splitter passed therethrough; a second quarter-wave plate that converts a reflected light reflected on a reference flat into a first polarized reflected wave after a second polarized wave transmitted by the polarizing beam splitter passed therethrough; a third quarter-wave plate that generates interference signals by occurring phase lag of the second polarized reflected wave and the first polarized reflected wave, as the second reflected wave transmitted by the polarizing beam splitter and the first polarized reflected wave reflected by the polarizing beam splitter passed therethrough; an imaging optical system on which an interference signal is incident after passing through the third quarter-wave plate; a slit that transmits only a selected line of an interference signal pattern passed through the imaging optical system; an imaging spectrometer that converts a line interference signal passed through the slit into a spectroscopic pattern; a pixelated polarizing camera that obtains and measures spectroscopic images having different phase-shift states; and an analysis unit that measures and analyzes a profile of the measurement object from the spectroscopic images having different phase-shift states.

According to another aspect of the present disclosure, the pixelated polarizing camera may be composed of a polarizer mask and a 2D sensor array.

According to another aspect of the present disclosure, the polarizer mask is composed of a repeated pattern array of a 2×2 unit cell over the entire mask, the 2×2 unit cell is a micro polarizer pattern array having four different polarization axes and the 2D sensor array is aligned to each individual polarizer element of the micro polarizer pattern array. Thus, angle-resolved spectroscopic images having four different phase-shift states may be obtained through the pixelated polarizing camera.

According to another aspect of the present disclosure, the apparatus for measuring a thickness and a profile of a multilayer thin film using a vibration insensitive interferometer may further include a shutter placed between the second quarter-wave plate and the reference flat.

According to another aspect of the present disclosure, when the shutter is opened, the pixelated polarizing camera may obtain interference signal images having four different phase-shift states for interference signals of the reference flat and the measurement object, and the analysis unit may analyze a phase of the measurement object based on the interference signal images having four different phase-shift states.

According to another aspect of the present disclosure, when the shutter is closed, the pixelated polarizing camera obtains four reflected light images for the reflected light on the measurement object through micro polarizers having four different polarization axes for a reflected light of the measurement object, the pixelated polarizing camera obtains four reflected light images for the reflected light on a reference surface through the micro polarizers having four different polarization axes for the reflected light of the reference surface, and the analysis unit may analyze an absolute reflectance of the measurement object based on the four reflected light images of the measurement object, the four reflected light images of the reference surface and an absolute reflectance of the reference surface.

According to another aspect of the present disclosure, the apparatus for measuring a thickness and a profile of a multilayer thin film using a vibration insensitive interferometer may further comprise a linear polarizer placed between the illumination optical module and the polarizing beam splitter and adjusting a ratio of the first polarization and the second polarization.

According to a second aspect of the present disclosure, a method for measuring a thickness and a profile of a multilayer thin film using a vibration insensitive interferometer may include steps of: emitting light from a broad-band source of the illumination optical module (Step 1); reflecting a first polarized wave of light emitted from the illumination optical module by a polarizing beam splitter, and transmitting a second polarized wave (Step 2); converting a reflected light reflected on a measurement object into a second polarized reflected wave by passing the reflected light through a first quarter-wave plate again, after a first polarized wave reflected by the polarized beam splitter passed through the first quarter-wave plate (Step 3); converting a reflected light reflected on a reference flat into a first polarized wave by passing the reflected light through a second quarter-wave plate again, after a second polarized wave transmitted by the polarizing beam splitter passed through the second quarter-wave plate (Step 4); generating interference signals by occurring phase lag of the second polarized reflected wave and the first polarized reflected wave, as the second reflected wave transmitted by the polarizing beam splitter and the first polarized reflected wave reflected by the polarizing beam splitter passed through a third quarter-wave (Step 5); undergoing incidence of an interference signal on an imaging optical system, after passing through the third quarter-wave plate (Step 6); transmitting only a selected line of an interference signal pattern passed through the imaging optical system through a slit (Step 7); converting a line interference signal passed through the slit into a spectroscopic pattern through an imaging spectrometer (Step 8); obtaining and analyzing spectroscopic images having different phase-shift states through a pixelated polarizing camera (step 9); and measuring and analyzing a phase of the measurement object from the spectroscopic images having different phase-shift states through an analysis unit (Step 10).

According to another aspect of the present disclosure, the pixelated polarizing camera is composed of a polarizer mask and a 2D sensor array, the polarizer mask is composed of a repeated pattern array of a 2×2 unit cell over the entire mask, the 2×2 unit cell is a micro polarizer pattern array having four different polarization axes, and the 2D sensor array is aligned to each individual polarizer element of the micro polarizer pattern array, and thus interference signal images having different phase-shift states may be obtained from each of four micro polarizers through the pixelated polarizing camera in the obtaining and measuring step.

According to another aspect of the present disclosure, when closing a shutter placed between the second quarter-wave plate and the reference flat, the second polarized wave transmitted by the polarized beam splitter undergoes no incidence on the reference flat, the pixelated polarizing camera obtains four reflected light images for the reflected light on the measurement object and four reflected light images for the reflected light on a reference surface, and the analysis unit analyzes an absolute reflectance of the measurement object based on the four reflected light images of the measurement object, the four reflected light images of the reference surface and an absolute reflectance of the reference surface.

According to another aspect of the present disclosure, the method for measuring a thickness and a profile of a multilayer thin film using a vibration insensitive interferometer may further include a step of adjusting a ratio of the first polarization and the second polarization by a linear polarizer placed between the illumination optical module and the polarizing beam splitter adjusting.

Advantageous Effects

According to an apparatus and a method for measuring a thickness and a profile of a multilayer thin film using a vibration insensitive interference method in accordance of an embodiment of the present disclosure, it is capable of measuring a phase of a measurement object by acquiring a plurality of different phase-shifted interference signal images at a time through interference signals between a reference flat and the measurement object by a polarizing beam splitter, a quarter-wave plate, a shutter and a pixelated polarizing camera, and also capable of measuring reflectance of the measurement object by acquiring a plurality of reflected signal images obtained at a time through reflected lights for each of a reference surface and the measurement object by a plurality of different polarizers.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings;

FIG. 1 shows a schematic view of an apparatus for measuring a thickness and a profile of a multilayer thin film using a vibration insensitive interference method according to an embodiment of the present disclosure, FIG. 2 shows an image obtained from a pixelated polarizing camera (left hand side), and a polarizer mask array and a unit cell thereof (right hand side), FIG. 3 shows a sub-pixel image corresponding to a polarizing angle of 90°, FIG. 4 shows a sub-pixel image corresponding to a polarizing angle of 45°, FIG. 5 shows a sub-pixel image corresponding to a polarizing angle of 135°, FIG. 6 shows a sub-pixel image corresponding to a polarizing angle of 0°, FIG. 7 shows an image when obtaining interference signals of a measurement object and a reference flat as a shutter according to an embodiment of the present disclosure is off (opened), FIG. 8 shows a phase-shifted interference signal image obtained by a 90° polarizer, FIG. 9 shows a phase-shifted interference signal image obtained by a 45° polarizer, FIG. 10 shows a phase-shifted interference signal image obtained by a 135° polarizer, FIG. 11 shows a phase-shifted interference signal image obtained by a 0° polarizer, FIG. 12 shows images having phase information, obtained from four interference signal images having different phase-shift states, FIG. 13 shows a flowchart depicting a procedure for measuring a reflected light of a measurement object when the shutter according to an embodiment of the present disclosure is on(closed), FIG. 14 shows a flowchart depicting a procedure for measuring a reflected light of a reference surface when the shutter according to an embodiment of the present disclosure is on (closed), and FIG. 15 shows a flowchart depicting a procedure for obtaining an absolute reflectance of the measurement object from the reflected lights of the measurement object and the reference surface.

REFERENCE NUMBERS

1: Measurement object
2. Reference flat
10: Illumination optical module
11: Light Source
12: Illumination optical system
13: Linear polarizer
20: Polarizing beam splitter
30: First quarter-wave plate
40: Second quarter-wave plate
41: Shutter
50: Third quarter-wave plate
60: Imaging optical system
61: Slit
70: Imaging spectrometer
80: Pixelated polarizing camera
81: Polarizer mask array
82: 2×2 unit cell
100: Apparatus for measuring a thickness and a profile of a multilayer thin film using a vibration insensitive interference method

DETAILED DESCRIPTION

Best Mode

Hereinafter, described is the configuration of an apparatus 100 for measuring a thickness and a profile of a multilayer thin film using a vibration insensitive interference method according to an embodiment of the present disclosure. FIG. 1 shows a schematic view of the apparatus 100 for measuring a thickness and a profile of a multilayer thin film using a vibration insensitive interference method according to an embodiment of the present disclosure.

As shown in FIG. 1, it is seen that the apparatus 100 for measuring a thickness and a profile of a multilayer thin film using a vibration insensitive interference method according to an embodiment of the present disclosure is configured to include an illumination optical module 10, a linear polarizer 13, a polarizing beam splitter 20, a first quarter-wave plate 30, a second quarter-wave plate 40, a shutter 41, a reference flat 2, a third quarter-wave plate 50, an imaging optical system 60, a slit 61, an imaging spectrometer 70, a pixelated polarizing camera 80 and the like.

The illumination optical module 10 may be configured to include a broad-band light source 11 that emits light, and an illumination optical system 12 that emits the light emitted from the broad-band light source 11 so as to have a uniform light intensity distribution for a measurement object 1. As a particular embodiment of the present disclosure, the broad-band light source 11 is configured to emit a light having a wavelength of 400~700 nm.

The polarizing beam splitter 20 is configured to reflect a first polarized wave of the light emitted from the illumination optical module 10 and to transmit a second polarized wave. That is, this is configured to reflect an S wave and to transmit a P wave.

The linear polarizer is configured to be placed between the polarizing beam splitter 20 and the illumination optical system 12 so as to adjust a ratio of the S and P waves.

The first quarter-wave plate 30 is configured to convert a reflected light reflected on the measurement object 1 into the P wave, after the S wave reflected by the polarizing beam splitter 20 passed therethrough. Thus, the reflected and then converted P reflected wave transmits the polarizing beam splitter 20.

Further, when the shutter 41 is opened, the second quarter-wave plate 40 is configured to convert a reflected light reflected on the reference flat 2 into the S reflected wave, after the P wave transmitted by the polarizing beam splitter 20 passed therethrough. Thus, the S reflected wave that was reflected on the reference flat 2 and then converted by the second quarter-wave plate 40 is reflected on the polarizing beam splitter 20.

The P reflected wave transmitted by the polarizing beam splitter 20 and the S reflected wave reflected by the polarizing beam splitter 20 pass through the third quarter-way plate 50 and phase lag between the P and S waves is occurred by the third quarter-wave plate 50. Thus, interference signals are generated.

The interference signal is incident on the imaging optical system 60 after passing through the third quarter-wave plate 50, and transmitted are only a selected line of an interference signal pattern passed through the imaging optical system 60 through the slit 61.

The line interference signal passed through the slit 61 is converted into a spectroscopic pattern by the imaging spectrometer 70, and spectroscopic images having different phase-shift states are obtained and measured by the pixelated polarizing camera 80.

The analysis unit measures and analyzes a profile of the measurement object 1 from the spectroscopic images having different phase-shift states.

DESCRIPTION OF EMBODIMENTS

FIG. 2 shows an image obtained from a pixelated polarizing camera (left hand side), and a polarizer mask array and a unit cell thereof (right hand side).

The pixelated polarizing camera 80 according to an embodiment of the present disclosure is composed of a polarizer mask and a 2D sensor. The polarizer mask is composed of a repeated pattern array of a 2×2 unit cell over the entire mask, the 2×2 unit cell 82 is a micro polarizer pattern array 81 having four different polarization axes, and the 2D sensor array is aligned to each individual polarizer element of the micro polarizer pattern array. Thus, angle-resolved spectroscopic images having four different phase-shift states may be obtained through the pixelated polarizing camera 80.

As shown in FIG. 2, it is seen that the 2×2 unit cell 82 is composed of a 90° micro polarizer, a 45° micro polarizer, a 135° micro polarizer and a 0° micro polarizer. Thus, different phase-shifted interference signal images may be obtained with one single-shot.

FIG. 3 shows a sub-pixel image corresponding to a polarizing angle of 90°, FIG. 4 shows a sub-pixel image corresponding to a polarizing angle of 45°, FIG. 5 shows a sub-pixel image corresponding to a polarizing angle of 135°, and FIG. 6 shows a sub-pixel image corresponding to a polarizing angle of 0°.

FIG. 7 shows an image when obtaining interference signals of a measurement object and a reference flat as a shutter according to an embodiment of the present disclosure is off (opened). Further, FIG. 8 shows a phase-shifted interference signal image obtained by a 90° polarizer, FIG. 9 shows a phase-shifted interference signal image obtained by a 45° polarizer, FIG. 10 shows a phase-shifted interference signal image obtained by a 135° polarizer, and FIG. 11 shows a phase-shifted interference signal image obtained by a 0° polarizer.

FIG. 12 shows images having phase information, obtained from four interference signal images having different phase-shift states. That is, a phase of the measurement object may be obtained from the phase-shifted interference signal image obtained by the 90° polarizer, the phase-shifted interference signal image obtained by the 45° polarizer, the phase-shifted interference signal image obtained by the 135° polarizer and the phase-shifted interference signal image obtained by the 0° polarizer.

Further, according to an embodiment of the present disclosure, the shutter 41 is placed between the second quarter-wave plate 40 and the reference flat 2. As mentioned above, when the shutter 41 is off (opened), a phase of the measurement object 1 may be obtained by acquiring interference signals in between the reference flat 2 and the measurement object 1.

That is, when the shutter 41 is opened, the pixelated polarizing camera 80 obtains interference signal images having four different phase-shift states for interference signals of the reference flat 2 and the measurement object 1, and the analysis unit analyzes a phase of the measurement object 1 based on the interference signal images having four different phase-shift states.

When the shutter is on (closed), the respective reflected lights for the measurement object 1 and a reference surface (not illustrated) may be measured, and an absolute reflectance of the measurement object 1 may be obtained based on these reflected lights for the measurement object 1 and for the reference surface. FIG. 13 shows a flowchart depicting a procedure for measuring a reflected light of a measurement object when the shutter according to an embodiment of the present disclosure is on (closed). As shown in FIG. 5, it is seen that the pixelated polarizing camera 80 obtains four (90°, 45°, 135°, 0°) reflected light images of the measurement object through micro polarizers having four different polarization axes for a reflected light of the measurement object 1 and that an average light intensity therefor is calculated.

The reference surface (not illustrated) of which an absolute is already know is placed at a position where the measurement object 1 is mounted and a reflected light for the reference surface is measured. FIG. 14 shows a flowchart depicting a procedure for measuring a reflected light of a reference surface when the shutter 41 according to an embodiment of the present disclosure is on (closed).

As shown in FIG. 14, it is seen that the pixelated polarizing camera 80 obtains the four (90°, 45°, 135°, 0°) reflected light images of the reference surface through the micro polarizers having four different polarization axes for a reflected light of the reference surface and that an average light intensity therefor is calculated.

FIG. 15 shows a flowchart depicting a procedure for obtaining an absolute reflectance of the measurement object from the reflected lights of the measurement object and the reference surface.

An absolute reflectance ($R_{sam}$) of the measurement object may be calculated from an average light intensity ($I_{sam}$) of the reflected light for the measurement object 1, an average light intensity ($I_{ref}$) of the reflected light for the reference surface and already known absolute reflectance ($R_{ref}$) of the reference surface.

The invention claimed is:

1. In an apparatus for profile measurement of a measurement object coated with a multilayer thin film, an apparatus for measuring a thickness and a profile of a multilayer thin film using a vibration insensitive interferometer comprising:

an illumination optical module that has a light source for emitting light;

a polarizing beam splitter that reflects a first polarized wave of light emitted from the illumination optical module, and transmits a second polarized wave;

a first quarter-wave plate that converts a reflected light reflected on a measurement object into a second polarized reflected wave after the first polarized wave reflected by the polarizing beam splitter passed therethrough;

a second quarter-wave plate that converts a reflected light reflected on a reference flat into a first polarized reflected wave after a second polarized wave transmitted by the polarizing beam splitter passed therethrough;

a third quarter-wave plate that generates interference signals by occurring phase lag of the second polarized reflected wave and the first polarized reflected wave, as the second reflected wave transmitted by the polarizing beam splitter and the first polarized reflected wave reflected by the polarizing beam splitter passed therethrough;

an imaging optical system on which an interference signal is incident after passing through the third quarter-wave plate;

a slit that transmits only a selected line of an interference signal pattern passed through the imaging optical system;

an imaging spectrometer that converts a line interference signal passed through the slit into a spectroscopic pattern;

a pixelated polarizing camera that obtains and measures spectroscopic images having different phase-shift states; and an analysis unit that measures and analyzes a profile of the measurement object from the spectroscopic images having different phase-shift states, wherein the pixelated polarizing camera consists of a polarizer mask and a 2D sensor array, wherein the polarizer mask consists of a repeated pattern array of a 2×2 unit cell over the entire mask, the 2×2 unit cell is a micro polarizer pattern array having four different polarization axes, the 2D sensor array is aligned to each individual polarizer element of the micro polarizer pattern array, and thus the spectroscopic images having four different phase-shift states are obtained through the pixelated polarizing camera, wherein the apparatus for measuring a thickness and a profile of a multilayer thin film using a vibration insensitive interferometer further comprises a shutter placed between the second quarter-wave plate and the reference flat, wherein when the shutter is opened,
the pixelated polarizing camera obtains interference signal images having four different phase-shift states for interference signals of the reference flat and the measurement object, and
the analysis unit analyzes a phase of the measurement object based on the interference signal images having four different phase-shift states, and wherein when the shutter is closed,
the pixelated polarizing camera obtains four reflected light images for the reflected light on the measurement object through micro polarizers having four different polarization axes for a reflected light of the measurement object,
the pixelated polarizing camera obtains four reflected light images for the reflected light on a reference surface through the micro polarizers having four different polarization axes for the reflected light of the reference surface, and
the analysis unit analyzes an absolute reflectance of the measurement object based on the four reflected light images of the measurement object, the four reflected light images of the reference surface, and an absolute reflectance of the reference surface, and wherein the apparatus for measuring a thickness and a profile of a multilayer thin film using a vibration insensitive interferometer further comprises a linear polarizer placed between the illumination optical module and the polarizing beam splitter and adjusting a ratio of the first polarization and the second polarization.

2. The apparatus of claim 1, wherein the reflective surface is placed at a position where the measurement object is mounted.

3. A method for measuring a thickness and a profile of a multilayer thin film using a vibration insensitive interferometer, comprising steps of:
emitting light from a broad-band source of an illumination optical module (Step 1);
reflecting a first polarized wave of light emitted from the illumination optical module by a polarizing beam splitter, and transmitting a second polarized wave (Step 2);
converting a reflected light reflected on a measurement object into a second polarized reflected wave by passing the reflected light through a first quarter-wave plate again, after a first polarized wave reflected by the polarized beam splitter passed through the first quarter-wave plate (Step 3);
converting a reflected light reflected on a reference flat into a first polarized wave by passing the reflected light through a second quarter-wave plate again, after a second polarized wave transmitted by the polarizing beam splitter passed through the second quarter-wave plate (Step 4);
generating interference signals by occurring phase lag of the second polarized reflected wave and the first polarized reflected wave, as the second reflected wave transmitted by the polarizing beam splitter and the first polarized reflected wave reflected by the polarizing beam splitter passed through a third quarter-wave (Step 5);
undergoing incidence of an interference signal on an imaging optical system, after passing through the third quarter-wave plate (Step 6);
transmitting only a selected line of an interference signal pattern passed through the imaging optical system through a slit (Step 7);
converting a line interference signal passed through the slit into a spectroscopic pattern through an imaging spectrometer (Step 8);
obtaining and analyzing spectroscopic images having different phase-shift states through a pixelated polarizing camera (Step 9); and
measuring and analyzing a phase of the measurement object from the spectroscopic images having different phase-shift states through an analysis unit (Step 10),
wherein the pixelated polarizing camera consists of a polarizer mask and a 2D sensor array, the polarizer mask consists of a repeated pattern array of a 2×2 unit cell over the entire mask, the 2×2 unit cell is a micro polarizer pattern array having four different polarization axes, and the 2D sensor array is aligned to each individual polarizer element of the micro polarizer pattern array, and thus interference signal images having different phase-shift states is obtained from each of four micro polarizers through the pixelated polarizing camera in the obtaining and measuring step,
wherein when opening a shutter placed between the second quarter-wave plate and the reference flat,
the pixelated polarizing camera obtains interference signal images having four different phase-shift states for interference signals of the reference flat and the measurement object, and
the analysis unit analyzes a phase of the measurement object based on the interference signal images having four different phase-shift states, and
wherein when closing the shutter placed between the second quarter-wave plate and the reference flat,
the second polarized wave transmitted by the polarized beam splitter undergoes no incidence on the reference flat,
the pixelated polarizing camera obtains four reflected light images for the reflected light on the measurement object and four reflected light images for the reflected light on a reference surface, and
the analysis unit analyzes an absolute reflectance of the measurement object based on the four reflected light images of the measurement object, the four reflected light images of the reference surface, and an absolute reflectance of the reference surface, and
wherein the method for measuring a thickness and a profile of a multilayer thin film using a vibration insensitive interferometer further comprises adjusting a ratio of the first polarization and the second polarization by a linear polarizer placed between the illumination optical module and the polarizing beam splitter.

* * * * *